US009626552B2

United States Patent
Eshghi et al.

(10) Patent No.: US 9,626,552 B2
(45) Date of Patent: Apr. 18, 2017

(54) CALCULATING FACIAL IMAGE SIMILARITY

(75) Inventors: Kave Eshghi, Los Altos, CA (US); Mehran Kafai, Riverside, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 784 days.

(21) Appl. No.: 13/418,112

(22) Filed: Mar. 12, 2012

(65) Prior Publication Data
US 2013/0236068 A1 Sep. 12, 2013

(51) Int. Cl.
*G06K 9/00* (2006.01)
(52) U.S. Cl.
CPC .................. *G06K 9/00288* (2013.01)
(58) Field of Classification Search
None
See application file for complete search history.

(56) References Cited

U.S. PATENT DOCUMENTS

| 7,127,087 | B2 | 10/2006 | Huang et al. |
| 7,564,994 | B1 | 7/2009 | Steinberg et al. |
| 7,684,651 | B2 | 3/2010 | Tang et al. |
| 2005/0157952 | A1* | 7/2005 | Gohda et al. ............... 382/305 |
| 2010/0080464 | A1* | 4/2010 | Sawai et al. ............... 382/190 |
| 2012/0288166 | A1* | 11/2012 | Sun et al. ................... 382/118 |

OTHER PUBLICATIONS

Blanz et al., "Face Recogntion Based on Fitting a 3D Morphable Model", Sep. 2003, IEEE Transactions on Pattern Analysis and Machine Intelligence, vol. 25, No. 9, pp. 1063-1074.*
Arashloo, S.R. et al; Pose-Invariant Face Matching Using MRF Energy Minimization Framework; University of Surrey, United Kingdom; Jul. 2011.
Li, E. et al; Adapting Geometric Attributes for Expression-invariant 3D Face Recognition; Simon Fraser University; Jun. 13-15, 2007; pp. 21-32.

* cited by examiner

*Primary Examiner* — Sumati Lefkowitz
*Assistant Examiner* — David Perlman
(74) *Attorney, Agent, or Firm* — HP Inc. Patent Department

(57) ABSTRACT

In one embodiment, for a first image, a first vector of similarity to a set of reference images is calculated as a first face descriptor, and for a second image, a second vector of similarity to the set of reference images is calculated as a second face descriptor. A similarity measure between the first face descriptor and the second face descriptor is then calculated.

16 Claims, 4 Drawing Sheets

CALCULATING FACIAL IMAGE SIMILARITY

BACKGROUND

Face recognition is an increasingly important technology due to its use in many different areas such as organizing photo albums, image tagging on social networking and picture sharing sites, tracking images on the Internet, gaming systems that have advanced motion sensing capabilities, surveillance, secure system logins, and so on. One common use scenario for face recognition is identifying whether probe images (e.g., captured from a surveillance system) correspond to images of individuals stored in an image gallery. Current face recognition algorithms perform with significant accuracy under controlled conditions, such as when the probe and gallery images are taken in the same pose. However, the performance of such algorithms decreases significantly when the images are not in the same pose.

BRIEF DESCRIPTION OF THE DRAWINGS

The present embodiments will now be described, by way of example, with reference to the accompanying drawings, in which.

DETAILED DESCRIPTION

Overview

Figure 1:
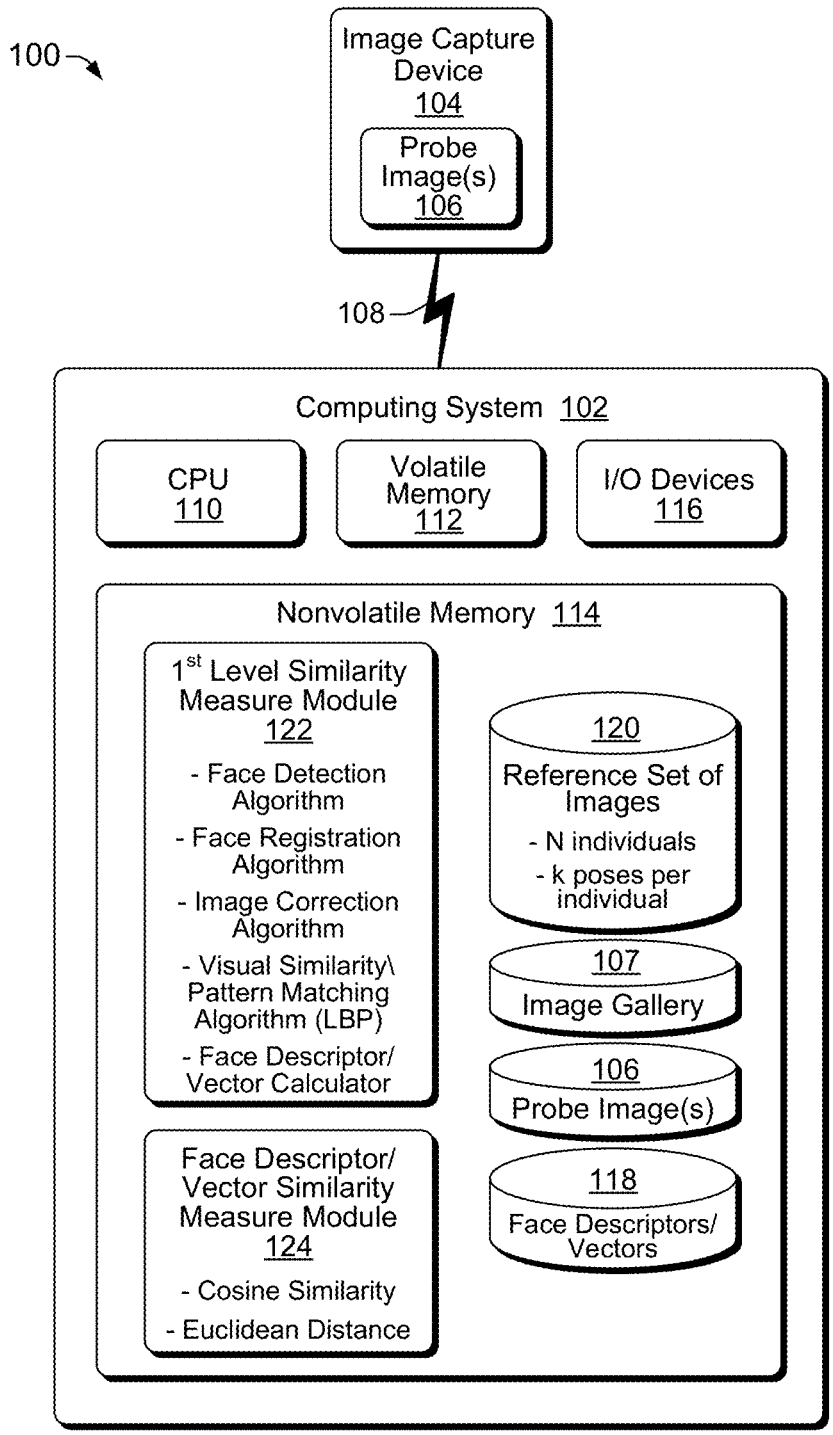
FIG. 1 shows an exemplary facial image similarity system environment suitable for calculating facial image similarity as disclosed herein, according to an embodiment.

As generally noted above, current face recognition algorithms can identify when probe images and gallery images correspond to the same individual with significant accuracy as long as the images are taken in the same pose. When the probe and gallery pictures are taken in the same pose (e.g., frontal or profile), the task essentially boils down to a pattern recognition problem. The gallery and probe images are first processed using a pattern matching algorithm (e.g., Local Binary Patterns or Local Phase Quantization), creating face descriptors. The probe descriptors are compared with the gallery descriptors using an appropriate distance measure, such as Euclidean distance. Gallery images that are closest in the distance measure to a probe image are deemed to be of the same individual.

However, when the probe and gallery images are from different poses (e.g., the probe image is a profile pose, whereas the gallery image is frontal pose), the patterns are very different. Using a standard pattern matching algorithm to compare the different patterns from the different image poses leads to poor results.

Most prior solutions to the problem of across pose face recognition assume that for each individual, multiple images in different poses are available (either in the gallery images or among the probe images). This assumption is not always valid, however. For example, in surveillance or photo album applications, there may only be one image available in the gallery and one image available as a probe image, and these images are most likely to be of different poses. While there are algorithms that can match a single gallery image with a single probe image in a different pose, such algorithms are very computationally expensive, particularly when the number of gallery images is large.

Embodiments of the present disclosure improve on prior methods of across pose face recognition, in general, by using similarity to a standard reference set as a face descriptor, and then computing similarity using the face descriptor. This approach is computationally efficient, achieves high accuracy, and is indifferent to variations in pose between a probe image and a gallery image. This approach to across pose face recognition uses a reference set of images that includes images of a group of N reference individuals that are taken in poses ranging from the right profile, through the frontal, and to the left profile. An existing image similarity algorithm (i.e., a pattern matching algorithm) is used to calculate an image similarity value between an image of interest, such as a probe image (e.g., a probe image captured by a surveillance system), and all of the image poses for each of the N reference individuals in the reference set. A face descriptor is then calculated for the probe image as an N-dimensional vector that includes the largest similarity value calculated for each of the N individuals. In the same manner, another face descriptor is calculated for a second image of interest, such as a gallery image (e.g., an image in a gallery of images) or a second probe image (e.g., a second image captured by a surveillance system). A similarity measure, such as a cosine similarity, is then calculated between the two face descriptors (i.e., between the two N-dimensional vectors). The higher the similarity measure is between the two face descriptors, the more likely it is that the two images of interest are of the same individual.

In one example embodiment, a processor-readable medium stores code representing instructions that when executed by a processor cause the processor to, for a first image, calculate a first vector of similarity to a set of reference images as a first face descriptor, and for a second image, calculate a second vector of similarity to the set of reference images as a second face descriptor. The instructions further cause the processor to calculate a similarity measure between the first face descriptor and the second face descriptor. In one implementation, the set of reference images comprises a plurality of facial image poses for each of a plurality of reference individuals, and calculating a vector of similarity to a set of reference images comprises calculating a vector of similarity to the plurality of facial image poses.

In another example embodiment, a processor-readable medium stores code representing instructions that when executed by a processor cause the processor to compare a probe image and a gallery image to a plurality of image poses for each of a plurality of reference individuals in a reference image set. The instructions further cause the processor to generate a probe image face descriptor from maximum visual similarity values obtained by comparing the probe image. The instructions also cause the processor to generate a gallery image face descriptor from maximum visual similarity values obtained by comparing the gallery image.

In another example embodiment, a facial image similarity system, comprises a reference set of images comprising a plurality of image poses for each of a plurality of reference individuals. The system also comprises a first level similarity measure module to calculate a probe image face descriptor and a gallery image face descriptor by comparing, respectively, a probe image and a gallery image to the image poses of each reference individual.

Illustrative Embodiments

FIG. 1 shows an exemplary facial image similarity system environment 100 suitable for calculating facial image similarity as disclosed herein, according to an embodiment of the disclosure. The exemplary system environment 100 includes a computing system 102 for calculating facial image similarity. In some implementations, the facial image similarity system environment 100 may include an image capture device 104 to provide probe images 106 to computing system 102 through an input mechanism 108 such as a cable, a memory storage device or a network. Thus, image capture device 104 is intended to be any of a variety of image capture devices located remotely or locally including, for example, a smart phone, a digital camera, a surveillance system, a scanner, and so on. Accordingly, in different implementations, input mechanism 108 can include a range of mechanisms such as a cable coupling a camera or a scanner with computing system 102, a memory card or memory stick being inserted into computing system 102, a network to transfer data/images 106 from a smart phone or surveillance system to computing system 102, and so on. An input mechanism 108 implemented as a network 108 can be configured as any of a variety of conventional network topologies and types (including optical, wired and/or wireless networks), employing any of a variety of conventional network protocols (including public and/or proprietary protocols). Thus, a network 108 may include, for example, a corporate network, a home network, or the Internet, as well as one or more local area networks (LANs) and/or wide area networks (WANs) and combinations thereof.

Computing system 102 is intended to represent any of a variety of computing systems capable of receiving image data through an input mechanism 108, and analyzing and/or manipulating the image data in order to calculate facial image similarity as discussed herein below. Thus, in different embodiments a computing system 102 may be implemented, for example, as a work station, a desktop PC, a server computer, a tablet PC or other portable computer such as a PDA, a smartphone or other wireless communications device, combinations thereof, and so on.

Computing system 102 generally includes one or more processors (CPU) 110, a volatile memory 112 (i.e., RAM), and a nonvolatile memory 114 (i.e., non-transitory tangible media, such as ROM, hard disk, floppy disk, CD-ROM, etc.). Computing system 102 also includes various input/output devices 116 such as a keyboard, a mouse, a monitor, a touch sensitive screen, and so on. Nonvolatile memory 114 and volatile memory 112 comprise processor-readable media (i.e., non-transitory tangible media) that generally provide for the storage of computer/processor-readable instructions, data structures, applications, program modules and other data. Instructions stored in memories 114 and 112 (e.g., as applications or program modules) are executable by processor(s) 110 to cause the processor(s) to perform various tasks and functions related to the general operation of computing system 102, in addition to tasks and functions related to calculating facial image similarity.

Accordingly, in one implementation, computing system 102 implements various algorithms to calculate a similarity measure between two facial images of interest, such as a probe image 106 captured by a surveillance system 104 and a gallery image stored in a facial image gallery 107. Calculating a similarity measure between a probe image 106 and a gallery image 107 first involves, for both images, calculating a face descriptor 118 as a similarity to a standard reference set of images 120. The face descriptors 118 are then used to calculate the similarity measure between the probe image 106 and gallery image 107 as discussed below. In some implementations, face descriptors 118 may include pre-calculated face descriptors for each image in the image gallery 107.

Referring generally to memory 114 of computing system 102, algorithms in a first level similarity measure module 122 are executable to calculate a face descriptor 118 as an N dimensional real vector based on a standard reference set of images 120. The reference set of images 120 is a pre-established set of images that includes images taken in a number of different poses for each of N reference individuals. The different poses are typically, but not necessarily, different facial image poses. In other implementations the reference set of images 120 may include images of the N reference individuals that vary in aspects other than pose, or in addition to pose, such as facial expression, illumination, and so on.

Figure 2:
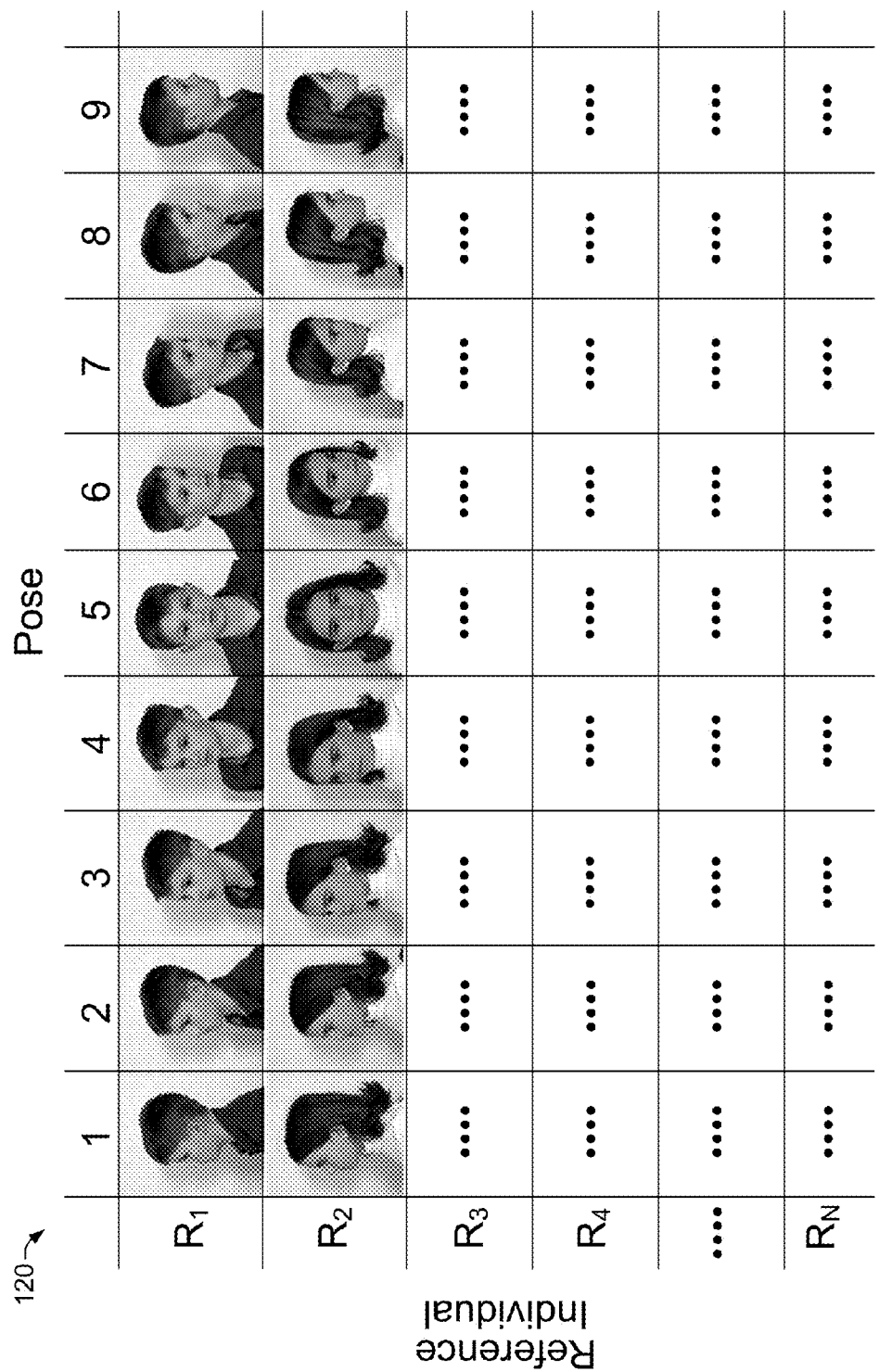
FIG. 2 shows an example of a reference set of images with a plurality of poses for each of N reference individuals, according to an embodiment.

FIG. 2 shows an example of a reference set of images 120 where there are nine different image poses for each of the N reference individuals, according to an embodiment of the disclosure. In one implementation, the poses in a reference set 120 begin at a left profile pose and progress incrementally through a frontal pose, and then through to a right profile pose. The reference individuals are denoted in FIG. 2 as $R_1$, $R_2$, . . . $R_N$, and for each reference individual, images are provided in poses from 1 to K. The image of a reference individual $R_U$ in pose v can be denoted as $I_{U,V}$. For example, $I_{2,5}$ is the frontal image of the reference individual $R_2$. As shown in FIG. 2, for K=9, pose 1 is the left profile, pose 5 is the frontal pose, and pose 9 is the right profile. This image pose configuration is provided as an example only, however, and other configurations are possible and are contemplated herein. For example, the poses could be reversed such that pose 1 is the right profile and pose 9 is the left profile. In addition, while only nine poses are illustrated in FIG. 2 for each reference individual, this number is only an example and is not intended to be limiting. Typically, a reference set 120 includes a greater number of poses than the nine shown in FIG. 2. A greater number of poses in a reference set 120 generally provides a higher degree of accuracy in the similarity measure.

The N reference individuals in reference set 120 comprise individuals selected for the general purpose of providing a wide variety of facial features. Therefore, the N reference individuals are typically selected from a diverse group of people that comprise, for example, males and females, many ethnicities, many different shapes and sizes, many different ages, and so on. While only two example reference individuals are actually illustrated in FIG. 2, an example number of reference individuals in a reference set 120 may be on the order of several hundred or more individuals. However, there is no intention hereby to limit the number of reference individuals within the reference set 120, and any suitable number of reference individuals is contemplated by this disclosure.

As noted above, the first level similarity measure module 122 calculates face descriptors 118 for images of interest (e.g., for a probe image 106 and a gallery image 107) as an N dimensional real vector based on the standard reference set of images 120. The components of an N dimensional vector (i.e., a face descriptor 118) are calculated using an existing pattern matching/visual similarity algorithm, S, such as Local Binary Patterns (LBP) algorithm or Local Phase Quantization algorithm. In general, given two images X and Y, the visual similarity algorithm (e.g., LBP) calculates S(X,Y) as a value of the visual similarity of the two images.

In the present implementation, for a probe image 106, the visual similarity algorithm LBP compares (i.e., matches facial patterns between) the probe image and all of the K pose images for each reference individual in the reference set 120. Denoting the face descriptor 118 of a probe image P as the N dimensional vector, $$F^P = <f_1, f_2, \ldots, f_N>,$$

the visual similarity algorithm LBP calculates each of the $f_1$, $f_2$, ..., $f_N$, vector components as follows:

$$f_i = \max(S(P,I_{i,1}), S(P,I_{i,2}), S(P,I_{i,3}), \ldots S(P,I_{i,K})).$$

Thus, $f_i$ is a visual similarity value calculated by comparing the probe image P 106 with each one of the images of the reference set of individuals $R_i$ in all of the K different poses using the visual similarity algorithm (e.g., LBP), and choosing the largest/maximum visual similarity value obtained as the value for $f_i$. The pose that best matches the probe image pose will naturally generate the largest visual similarity value for each reference set individual $R_i$. For example, if the pose of the probe image is most like pose 8 in FIG. 2, then the highest visual similarity value will occur when the algorithm compares the probe image P to pose 8 for each reference individual $R_i$. This effectively removes pose as a factor in determining the visual similarity values between the probe image P and each of the reference set individuals $R_i$, and thus provides a more accurate visual similarity value that is based on an appropriate comparison of like facial features between the probe image P and each of the reference set individuals $R_i$. The N dimensional vector or face descriptor 118 of the probe image P is then constructed or calculated as $F^P = <f_1, f_2, \ldots, f_N>$ by a vector calculator algorithm of module 122, using each of the vector component values of $f_i$ calculated by the visual similarity algorithm (e.g., LBP).

It is noted that prior to implementing the visual similarity algorithm (e.g., LBP), various pre-processing steps occur as part of the first level similarity measure in module 122. For example, a face detection algorithm determines that an image is an image of a face, rather than an image of something that is not a face. A face registration algorithm then determines location information about the facial features such as the eyes, nose, mouth, ears, etc. One or more image correction algorithms may also operate to adjust image lighting, clarity, and so on.

A face descriptor 118 for a gallery image 107 (or for another image such as another probe image) is calculated in the same way as discussed above. Thus, for a gallery image G 107, a visual similarity algorithm such as LBP compares (i.e., matches facial patterns between) the gallery image and all of the K pose images for each reference individual in the reference set 120. Denoting the face descriptor 118 of a gallery image G as the N dimensional vector, $$F^G = <f_1, f_2, \ldots, f_N>,$$

the visual similarity algorithm LBP calculates each of the $f_1$, $f_2$, ..., $f_N$, vector components as follows:

$$f_i = \max(S(G,I_{i,1}), S(G,I_{i,2}), S(G,I_{i,3}), \ldots S(G,I_{i,K})).$$

Thus, $f_i$ is a visual similarity value calculated by comparing the gallery image G 107 with each one of the images of the reference set of individuals $R_i$ in all of the K different poses using the visual similarity algorithm (e.g., LBP), and choosing the largest/maximum visual similarity value obtained as the value for $f_i$. The pose that best matches the gallery image pose will naturally generate the largest visual similarity value for each reference set individual $R_i$. The N dimensional vector or face descriptor 118 of the gallery image G is then constructed or calculated as $F^G = <f_1, f_2, \ldots, f_N>$ by a vector calculator algorithm of module 122, using each of the vector component values of $f_i$ calculated by the visual similarity algorithm (e.g., LBP).

Once the face descriptors 118 for two images (e.g., a probe image 106 and a gallery image 107) are calculated, they can be used to determine a similarity measure between the two images. For example, having calculated a face descriptor 118 for a probe image as an N dimensional vector $F^P = <f_1, f_2, \ldots, f_N>$, and a face descriptor 118 for a gallery image as an N dimensional vector $F^G = <f_1, f_2, \ldots, f_N>$, a face descriptor similarity measure module 124 calculates a similarity measure Q between the two descriptors (i.e., between the two vectors $F^P$ and $F^G$). The similarity measure is a commonly understood distance measure between the points of two vectors. One example of a similarity measure is cosine similarity. Another example of a similarity measure is Euclidean distance. In one implementation, the similarity measure Q between the two face descriptor vectors $F^P$ and $F^G$ (i.e., calculated above), can be denoted as $Q(F^P, F^G)$ and is calculated as follows:

$$Q(F^P, F^G) = \cos(F^P, F^G)$$

This calculation of similarity measure determines the degree of similarity between the probe image P and the gallery image G. The degree of similarity enables a user to determine if a probe image and a gallery image correspond to the same individual. The higher the similarity measure is between the two face descriptors, the more likely it is that the two images of interest are of the same individual.

Figure 3:
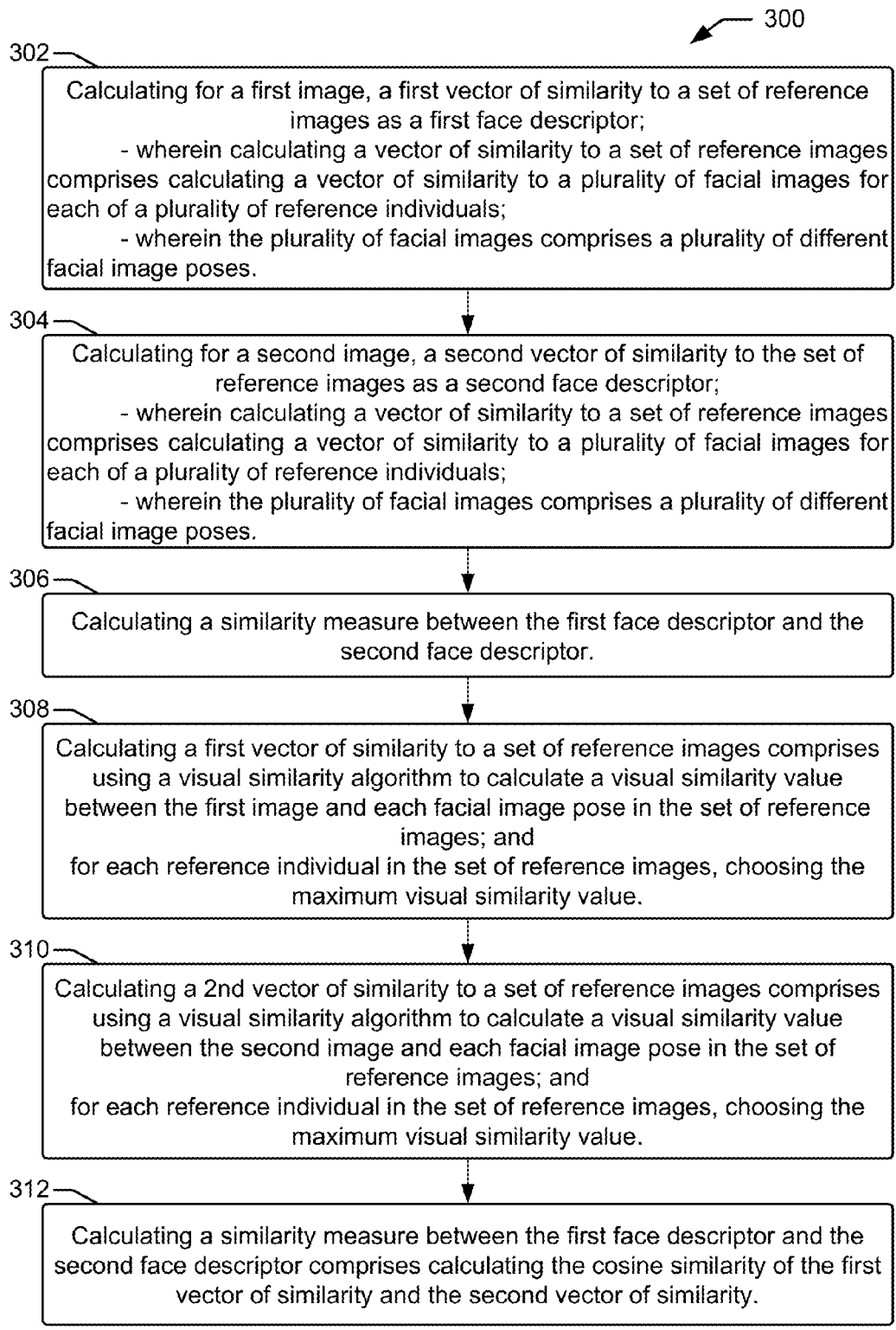
FIGS. 3 and 4 show flowcharts of example methods, according to embodiments.

FIG. 3 shows a flowchart of an example method 300, according to an embodiment of the disclosure. Method 300 is related to calculating facial image similarity discussed herein, and is associated with embodiments discussed above with respect to FIGS. 1-2. Details of the steps shown in method 300 can be found in the related discussion of such embodiments. The steps of method 300 may be embodied as programming instructions stored on a computer/processor-readable medium, such as memories 112 and 114 of computing system 102 as shown in FIG. 1. In an embodiment, the implementation of the steps of method 300 may be achieved by the reading and execution of such programming instructions by a processor, such as processor 110 as shown in FIG. 1. While the steps of method 300 are illustrated in a particular order, the disclosure is not limited in this regard. Rather, it is contemplated that various steps may occur in different orders than shown, and/or simultaneously with other steps.

Method 300 begins at block 302 with the step of calculating for a first image, a first vector of similarity to a set of reference images as a first face descriptor. Calculating a vector of similarity to a set of reference images comprises calculating a vector of similarity to a plurality of facial images for each of a plurality of reference individuals. In one implementation, the plurality of facial images comprises a plurality of different facial image poses. At block 304, the method 300 continues with calculating for a second image, a second vector of similarity to the set of reference images as a second face descriptor. As with the first image, for the second image, calculating a vector of similarity to a set of reference images also comprises calculating a vector of similarity to a plurality of facial images for each of a plurality of reference individuals. In one implementation, the plurality of facial images comprises a plurality of different facial image poses.

Method 300 continues at block 306 with calculating a similarity measure between the first face descriptor and the second face descriptor.

Method 300 continues at block 308, where calculating a first vector of similarity to a set of reference images as shown at block 302 comprises using a visual similarity algorithm to calculate a visual similarity value between the first image and each facial image pose in the set of reference images. Additionally at block 308, the method 300 includes choosing the maximum visual similarity value for each reference individual in the set of reference images. At block 310 of method 300, in a manner similar to block 308, calculating a second vector of similarity to a set of reference images as shown at block 304 comprises using a visual similarity algorithm to calculate a visual similarity value between the second image and each facial image pose in the set of reference images. Additionally at block 310, the method 300 includes choosing the maximum visual similarity value for each reference individual in the set of reference images.

At block 312 of method 300, calculating a similarity measure between the first face descriptor and the second face descriptor as shown at block 306 comprises calculating the cosine similarity of the first vector of similarity and the second vector of similarity.

Figure 4:
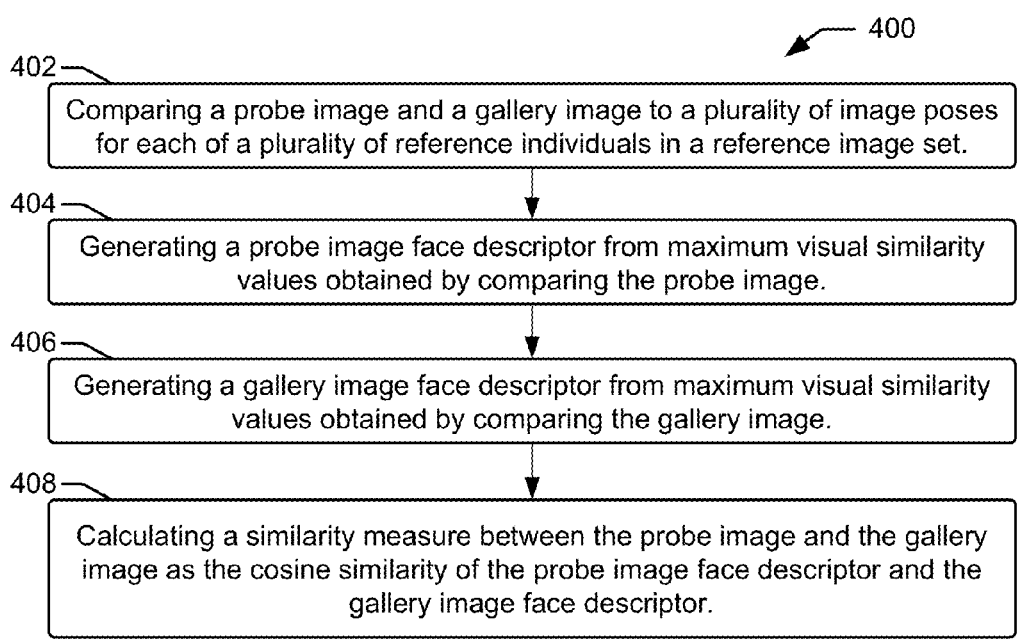

FIG. 4 shows a flowchart of another example method 400, according to an embodiment of the disclosure. Method 400 is related to calculating facial image similarity discussed herein, and is associated with embodiments discussed above with respect to FIGS. 1-2. Details of the steps shown in method 400 can be found in the related discussion of such embodiments. The steps of method 400 may be embodied as programming instructions stored on a computer/processor-readable medium, such as memories 112 and 114 of computing system 102 as shown in FIG. 1. In an embodiment, the implementation of the steps of method 400 may be achieved by the reading and execution of such programming instructions by a processor, such as processor 110 as shown in FIG. 1. While the steps of method 400 are illustrated in a particular order, the disclosure is not limited in this regard. Rather, it is contemplated that various steps may occur in different orders than shown, and/or simultaneously with other steps.

Method 400 begins at block 402 with comparing a probe image and a gallery image to a plurality of image poses for each of a plurality of reference individuals in a reference image set. At block 404, the method 400 continues with generating a probe image face descriptor from maximum visual similarity values obtained by comparing the probe image. Similarly, at block 406, the method 400 includes generating a gallery image face descriptor from maximum visual similarity values obtained by comparing the gallery image. The method 400 ends at block 408 with calculating a similarity measure between the probe image and the gallery image as the cosine similarity of the probe image face descriptor and the gallery image face descriptor.

What is claimed is:

1. A non-transitory processor-readable medium storing code representing instructions that when executed by a processor cause the processor to:
   for a first image, calculate a first vector of similarity to a set of two-dimensional reference images as a first face descriptor;
   for a second image, calculate a second vector of similarity to the set of reference images as a second face descriptor;
   calculate a similarity measure between the first face descriptor and the second face descriptor;
   wherein calculating a vector of similarity to a set of reference images comprises calculating a vector of similarity to a plurality of facial images for each of a plurality of reference individuals;
   wherein calculating a first vector of similarity to a set of reference images comprises:
      calculating, using a visual similarity algorithm, a visual similarity value between the first image and each facial image in the set of reference images; and
      for each reference individual in the set of reference images, choosing the maximum visual similarity value; and,
   wherein calculating a second vector of similarity to a set of reference images comprises:
      calculating, using a visual similarity algorithm, a visual similarity value between the second image and each facial image in the set of reference images; and
      for each reference individual in the set of reference images, choosing the maximum visual similarity value.

2. A processor-readable medium as recited in claim 1, wherein the plurality of facial images comprises a plurality of different facial image poses.

3. A processor-readable medium as recited in claim 1, wherein calculating a similarity measure between the first face descriptor and the second face descriptor comprises calculating the cosine similarity of the first vector of similarity and the second vector of similarity.

4. A processor-readable medium as recited in claim 1, wherein each vector includes a similarity measurement between the corresponding first or second image and each of said reference images.

5. A processor-readable medium as recited in claim 4, wherein said similarity measurement is calculated using a Local Binary Patterns (LBP) algorithm or a Local Phase Quantization algorithm.

6. A processor-readable medium as recited in claim 4, wherein said reference images comprise an image of each of multiple poses for each of a number of different individuals, said poses ranging from left profile to right profile including a frontal pose.

7. A processor-readable medium as recited in claim 1, wherein said reference images comprise an image of each of multiple poses for each of a number of different individuals, said poses ranging from left profile to right profile including a frontal pose.

8. A non-transitory processor-readable medium storing code representing instructions that when executed by a processor cause the processor to:
   compare a probe image and a gallery image to a plurality of image poses for each of a plurality of reference individuals in a reference image set;
   for each reference individual in the reference image set, choose a maximum visual similarity value;
   generate a probe image face descriptor from maximum visual similarity values obtained by comparing the probe image with each image pose for each of the plurality of reference individuals in the reference image set, wherein said probe image face descriptor is based on a first vector, said first vector based on a discrete similarity value from a comparison of said probe image and each image pose for each of the plurality of reference individuals in said reference image set; and
   generate a gallery image face descriptor from maximum visual similarity values obtained by comparing the gallery image with each image pose for each of the plurality of reference individuals in the reference image set, wherein said gallery image face descriptor is based on a second vector, said second vector based on a discrete similarity value from a comparison of said gallery image and each image pose for each of the plurality of reference individuals in said reference image set; and, calculate a similarity measure between the probe image face descriptor and the gallery image face descriptor.

9. A processor-readable medium as in claim 8, the instructions further causing the processor to:

calculate a similarity measure between the probe image and the gallery image as the cosine similarity of the probe image face descriptor and the gallery image face descriptor.

10. A facial image similarity system, comprising:

a memory device comprising a reference set of images comprising a plurality of image poses for each of a plurality of reference individuals;

a processor programmed with a first level similarity measure module to calculate a probe image face descriptor and a gallery image face descriptor by comparing, respectively, a probe image and a gallery image to each of the plurality of image poses for each of the plurality of reference individuals, and choosing a maximum visual similarity value for each reference individual in the plurality of reference individuals;

wherein said probe image face descriptor is based on a first vector, said first vector based on a number of discrete similarity values, each said discrete similarity value being generated by a comparison of said probe image to each of the plurality of image poses for each of the plurality of reference individuals in said reference set; and wherein said gallery image face descriptor is based on a second vector, said second vector based on a number of discrete similarity values, each said discrete similarity value being generated by a comparison of said gallery image to each of the plurality of image poses for each of the plurality of reference individuals in said reference set; and, a face descriptor similarity measure module to calculate a similarity measure between the probe image face descriptor and a gallery image face descriptor.

11. A facial image similarity system as in claim 10, wherein the first level similarity measure module comprises:

a visual similarity algorithm to calculate said discrete similarity values for each comparison of the probe and gallery images to image poses of the reference individuals.

12. A facial image similarity system as in claim 11, wherein the visual similarity algorithm comprises a Local Binary Patterns (LBP) algorithm or a Local Phase Quantization algorithm.

13. A facial image similarity system as in claim 10, wherein the face descriptor similarity measure module comprises similarity measures selected from the group consisting of cosine similarity measure and Euclidean distance measure.

14. A facial image similarity system as in claim 10, further comprising:

an image gallery comprising a number of images including said gallery image; and face descriptors pre-calculated for each image in the image gallery.

15. A facial image similarity system as in claim 10, wherein the first level similarity measure module comprises pre-processing algorithms selected from the group consisting of a face detection algorithm, a face registration algorithm, and an image correction algorithm.

16. A facial image similarity system as in claim 10, further comprising:

an image capture device to capture and provide probe images for comparison to the image poses of each reference individual.

* * * * *